E. SCHUYLER & W. A. HYLE.
SPRING WHEEL.
APPLICATION FILED JULY 22, 1909.
957,383.
Patented May 10, 1910.
2 SHEETS—SHEET 1.
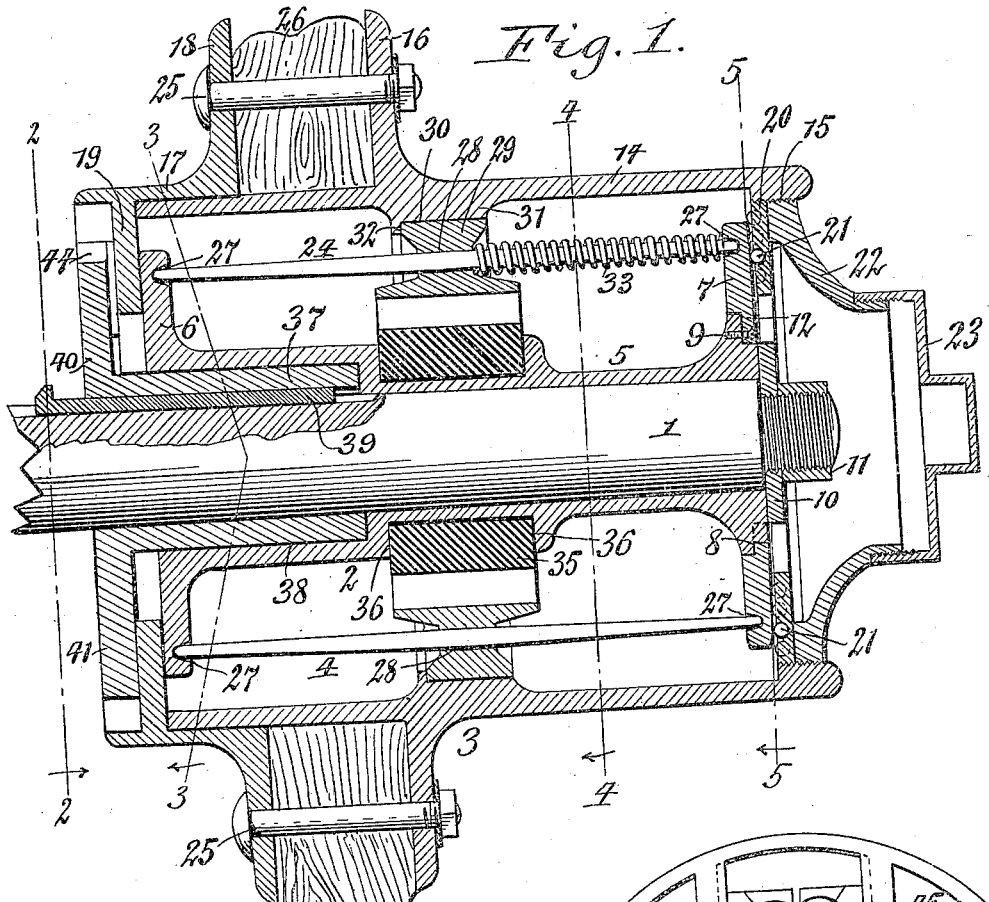
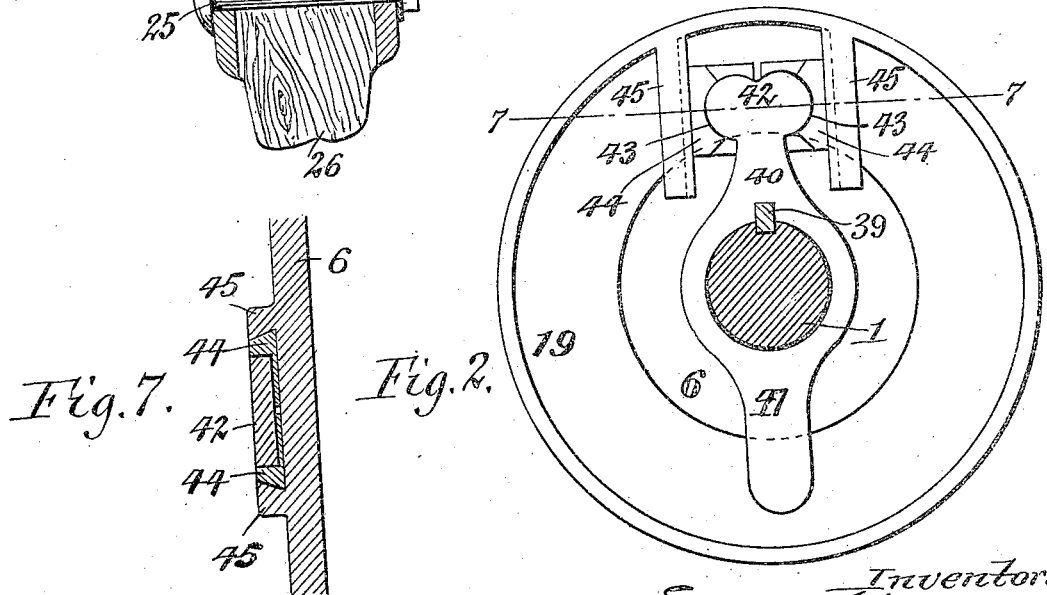
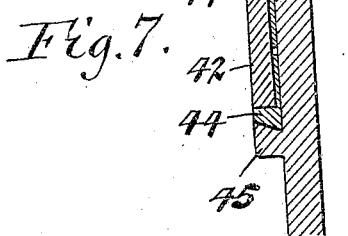
Witnesses:—
Walter H. Popp
Richard Sommer
Inventors
Edward Schuyler
William A. Hyle
by Geyer & Popp
Attorneys.

E. SCHUYLER & W. A. HYLE.
SPRING WHEEL.
APPLICATION FILED JULY 22, 1909.

957,383.

Patented May 10, 1910.
2 SHEETS—SHEET 2.

Witnesses:—
Walter H. Popp.
Richard Sommer.

Inventors
Edward Schuyler
William A. Hyle
by Geyer & Popp
Attorneys

UNITED STATES PATENT OFFICE.

EDWARD SCHUYLER, OF SYRACUSE, AND WILLIAM A. HYLE, OF BUFFALO, NEW YORK, ASSIGNORS OF ONE-THIRD TO LESLIE R. PRATT, OF BUFFALO, NEW YORK.

SPRING-WHEEL.

957,383.

Specification of Letters Patent. Patented May 10, 1910.

Application filed July 22, 1909. Serial No. 508,952.

*To all whom it may concern:*

Be it known that we, EDWARD SCHUYLER and WILLIAM A. HYLE, citizens of the United States, and residing at Syracuse, in the county of Onondaga and State of New York, and at Buffalo, in the county of Erie and State of New York, respectively, have invented new and useful Improvements in Spring-Wheels, of which the following is a specification.

This invention relates more particularly to a spring wheel in which the cushioning devices are arranged wholly within the hub of the wheel.

A wheel of this character is shown in Letters Patent of the United States No. 864,110, dated August 20, 1907, and the present invention is an improvement on the wheel shown in this patent.

The object of this invention is to secure greater resiliency and durability; to so construct the parts that they can be produced at low cost and permit of easy assembling and dismembering; and to provide means whereby the wheel is driven effectively from the axle or shaft on which the same is mounted.

Figure 3:
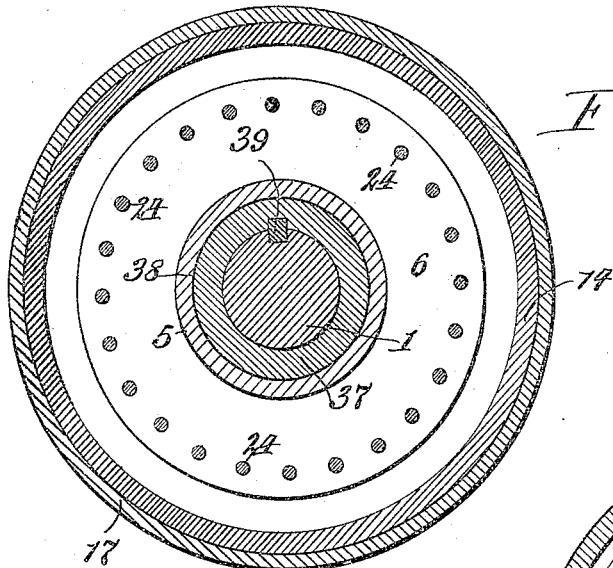
Figure 4:
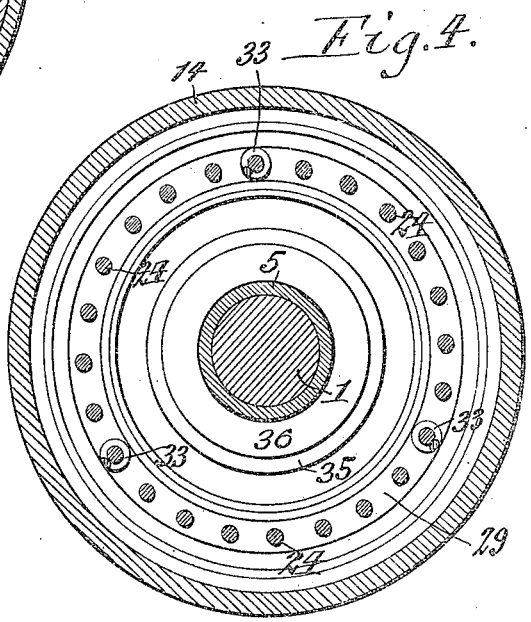
Figure 5:
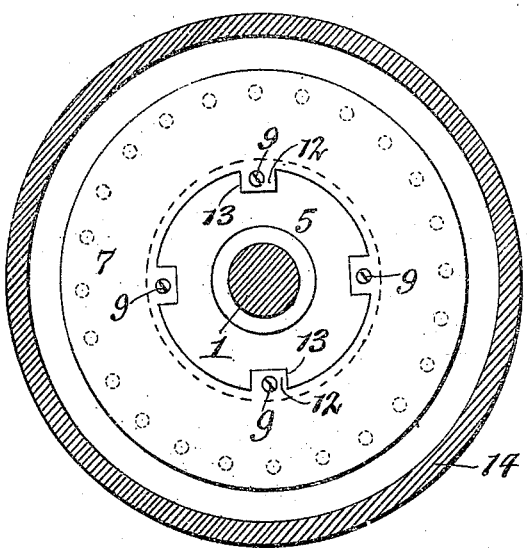
Figure 6:
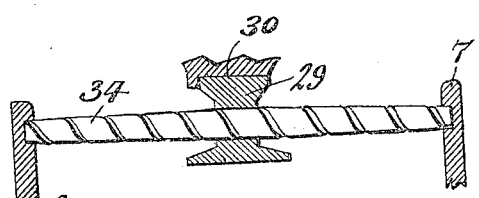

In the accompanying drawings consisting of 2 sheets: Figure 1 is a longitudinal sectional elevation of our improved spring wheel. Figs. 2, 3, 4 and 5 are vertical sections in the correspondingly numbered lines in Fig. 1. Fig. 6 is a fragmentary longitudinal section showing a modification of one of the spring bars. Fig. 7 is a fragmentary longitudinal section in line 7—7, Fig. 2.

Similar characters of reference indicate corresponding parts throughout the several views.

Although our improved wheel is designed for use in various kinds of vehicles, the same is shown in the drawings as mounted on the driving axle or shaft 1 of a motor vehicle or automobile which may be operated by any suitable motor.

In its general organization, our improved spring wheel comprises a hub composed of inner and outer sections 2, 3 and an annular row of longitudinal spring members forming a resilient connection between the hub sections.

The inner hub section comprises a tubular body, barrel or shell 5 which is arranged on the tapering outer part of the axle, an inner external annular flange 6 arranged on the inner end of said body and preferably formed integrally therewith, and an outer external annular flange 7 seated with its bore on a circular rabbet or shoulder 8 formed on the outer end of the body 5 and detachably secured thereto by means of screws 9, as shown, or by any other suitable means. This hub section is preferably held against outward movement on the axle by means of a screw washer 10 arranged on the axle and bearing against the outer end of the body 5 and a screw nut 11 arranged on the outer screw threaded end of the axle and bearing against the outer side of said washer. For the purpose of relieving the screws 9 from rotary shearing strains and holding the outer detachable flange 7 reliably against turning on the hub barrel 5, these parts are interlocked by means of a plurality of lugs 12 projecting inwardly from the bore of the flange 7 and seated in recesses 13 formed in the outer end of the barrel 5, as shown in Figs. 1 and 5.

The outer hub section comprises a tubular body, shell or barrel 14 having an internal screw thread 15 at its outer end and provided on the central part of its periphery with an external annular spoke flange 16, and a tubular collar 17 arranged on the inner part of the periphery of the body 14 and provided at its outer end with an external annular spoke flange 18 and at its inner end with an internal annular flange 19 which engages with the rear side of the inner or rear flange 6 of the inner hub section.

20 represents a detachable internal annular flange having a screw thread on its periphery which engages with the internal thread of the barrel of the outer hub section and extends along the outer or front side of the detachable flange 7 of the inner hub section. The coöperation of the flanges at the inner and outer ends of the hub sections causes these sections to be held against axial or longitudinal movement relative to each other but permits radial movement of the hub section in all directions relatively to each other.

In order to take up the end thrust and prevent the pressure of the inner hub section against the outer hub section from unscrewing the flange 20, the latter is provided on its inner side with a plurality of balls 21 which engage with the outer side of the flange 7, thereby reducing the frictional contact between the hub sections at this point and reducing the wear accordingly. The ball bearing flange 20 is further held in place by means of a clamping ring 22 screwed into the outer end of the outer hub section and against the outer side of the flange 20 and the outer ends of the hub sections are covered by a cap 23 screwed on the clamping ring 22.

The spokes 26 of the wheel are arranged at their inner end in the annular channel, groove or space between the spoke flanges of the outer hub section and are secured thereto by means of bolts 25, as shown in the drawings or by any other suitable means.

The means for yieldingly holding the hub sections concentrically relatively to each other are constructed as follows:

24 represents a plurality of longitudinal spring bars or rods which are arranged in an annular row in the space between the tubular bodies or barrels of the inner and outer hub sections and which form a resilient connection between said hub sections. In the preferred form, the several spring rods or bars are connected at opposite ends with the inner hub section and between their ends with the outer hub section. For this purpose the inner and outer flanges 7, 6, of the inner hub section are provided on their opposing sides with annular rows of recesses or sockets 27 in which the corresponding ends of the spring bars are seated, the companion sockets of both hub sections being lengthwise in line with each other and reliably retained in this position by means of the interlocking joint between the outer flange and barrel of the inner hub section.

The central parts of the several spring bars are seated in a plurality of openings 28 arranged in an annular row in a central bearing ring or web 29. The latter is seated with its periphery on an annular seat 30 formed on the bore of an internal annular flange 31 arranged centrally on the barrel of the outer hub section. Inward movement of this bearing ring is limited by means of an inner shoulder 32 on the flange 31 which is engaged by the inner side of the bearing ring. The latter is reliably held in engagement with the bearing ring by retaining devices 33, three of which are preferably employed and arranged on the front parts of equidistant spring bars and each bearing at its outer end against the inner side of the flange 7 while its inner end bears against the outer side of the bearing ring 29. These retaining devices may be variously constructed but are preferably constructed of coils of spring wire, as shown in Fig. 1, which causes the same to bear yieldingly against the bearing ring 29 and outer flange, thereby avoiding the necessity of accurately fitting the same to prevent rattling thereof which would be liable to occur if these devices were loose.

When the inner and outer hub sections are moved radially relatively to each other, this movement is resisted by the spring bars all of which are flexed simultaneously by the load or pressure to which the wheel is subjected and the springs also operate as a unit in restoring the hub sections to their concentric position relatively to each other, thereby yieldingly supporting the load imposed on the vehicle and also relieving the same from undue shock and vibration in passing over uneven surfaces on the road.

In order to prevent breakage of the spring bars under the load to which they are subjected, each of these bars is so constructed that it tapers from its central part toward opposite ends, as shown in Fig. 1. By this means the central parts of the spring bars which are subjected to the greatest strain are thicker and stronger and more capable of carrying the load while the parts on opposite sides of the center which are subjected to gradually decreasing strains are made thinner and weaker in the same measure, thereby proportioning the different parts of each spring bar in accordance with the strain upon the same and preserving the maximum resilience of the spring bar, whereby all parts of the latter operate practically under uniform conditions.

Instead of making each spring bar in the form of a round rod which tapers toward opposite ends, as shown in Figs. 1, 3, 4 and 5, the same effect may be produced by constructing this bar in the form of a coil spring 34 which rests at its opposite ends in the recesses of the inner and outer flanges 6, 7, of the inner hub section while its central part is arranged in an opening in the central bearing ring 29 of the outer hub section, as shown in Fig. 6.

Surrounding the central part of the barrel of the inner hub section is an annular or ring-shaped buffer 35 of rubber or similar material which receives the impact of the outer hub section and bearing ring 29 of the outer hub section and thereby limits the strain on the spring bars, if the radial deflection of the hub sections is excessive. This buffer is confined against lengthwise movement on the barrel of the inner hub section by means of shoulders 36 formed on said barrel and bearing against opposite ends of the buffer.

For the purpose of positively driving the outer hub section from the axle, the following transmitting means are provided: 37 represents a driving sleeve arranged within an enlargement 38 of the bore of the barrel of the inner hub section at the inner end of the latter and secured to the adjacent part of the axle by a key 39 or otherwise. At its inner end the driving sleeve is provided on diametrically opposite sides with radial arms or lugs 40, 41. The arm 41 bears directly against the exterior side of the inner flange of the outer hub section while the other arm 40 is provided at its free end with a rounded knuckle 42 which rests on its opposite sides in seats 43 formed on the opposing sides of two independent sections 44, 44 of a slide which are movable radially between two radial guide lugs 45 on the exterior of said flange. The opposing faces of said slide sections and guide lugs are beveled or dovetailed, so that their wide parts are nearest the flange 6, thereby confining the slide sections on the hub and preventing uneven wearing of the coöperating faces thereof, which would be liable to occur if the slide sections were permitted to move toward and from the flange 6 while moving radially thereon. By this means the outer hub section is free to move radially relatively to the axle and inner hub section but the outer hub section is compelled to turn with the axle for positively propelling the vehicle. If the inner and outer hub sections are deflected in a direction parallel with the arm 40, the two slide sections move radially together but when the movement of the hub sections relatively to each other is at an angle to the arm 40, the slide sections are moved in opposite directions by the action of the knuckle, thereby preventing cramping of the connection between the axle and outer hub section and permitting the latter to be driven freely in all positions of the parts. The driving arm 40 together with the driving sleeve 37 are prevented from being tipped outwardly or away from the respective end of the hub while under strain by reason of the arm 41 bearing against the opposite side of the outer hub section.

Although the driving mechanism is shown in the drawings at the inner end of the hub it is to be understood that this invention is not limited to this location inasmuch as the same results are obtained by locating the driving mechanism elsewhere on the hub.

We claim as our invention:

1. A spring wheel comprising an inner hub section composed of a barrel, an integral flange arranged at one end of the barrel and a detachable flange at its opposite end, a plurality of spring bars seated at their ends on said flanges, and an outer hub section supported on the central parts of said spring bars.

2. A spring wheel comprising an inner hub section composed of a barrel having a fixed flange at one end and a plurality of recesses at its opposite end, a detachable flange having lugs engaging with said recesses, spring bars resting at opposite ends on said flanges, and an outer hub section supported on the central part of said spring bars.

3. A spring wheel comprising an inner hub section having a barrel provided at its opposite ends with external flanges, a plurality of spring bars resting at opposite ends on the flanges of the inner hub barrel section, an outer hub section having a barrel provided centrally in its bore with an annular seat and a shoulder at one side of said seat, a bearing ring engaging with said seat and shoulder and provided with openings which receive the central parts of said bars, retaining devices for the bearing ring and means for maintaining the outer hub section in positive relation to the inner hub section.

4. A spring wheel comprising an inner hub section having a barrel provided at its opposite ends with external flanges, a plurality of spring bars resting at opposite ends on the flanges of the inner hub barrel section, an outer hub section having a barrel provided centrally in its bore with an annular seat and a shoulder at one side of said seat, a bearing ring engaging with said seat and shoulder and provided with openings which receive the central parts of said bars, retaining devices arranged on some of said bars and each bearing at one end against that side of the bearing ring opposite that engaging with said shoulder while its opposite end bears against the flange at the respective end of the inner hub section and means for maintaining the outer hub section in positive relation to the inner hub section.

5. A spring wheel comprising an inner hub section having a barrel provided at its opposite ends with external flanges, a plurality of spring bars resting at opposite ends on the flanges of the inner hub barrel section, an outer hub section having a barrel provided centrally in its bore with an annular seat and shoulder at one side of said seat, a bearing ring engaging with said seat and shoulder and provided with openings which receive the central parts of said bars, retaining devices of coil spring form arranged on some of said bars and each bearing at one end against that side of the bearing ring opposite that engaging with said shoulder while its opposite end bears against the flange at the respective end of the inner hub section and means for maintaining the outer hub section in positive relation to the inner hub section.

6. A spring wheel comprising an inner hub section, an outer hub section, and a plurality of longitudinal spring bars supported at their ends on one of said sections and supported between their ends on the other section, each of said bars being tapered toward its ends.

7. A spring wheel comprising an axle, a plurality of spring bars arranged in an annular row around said axle and each tapered toward its ends, means for supporting the spring bars at a distance from the axle, and a hub section movable radially against said spring bars.

8. A spring wheel comprising an inner hub section having flanges at its inner and outer ends, spring bars supported on said flanges, an outer hub section supported on said bars and provided with an inner flange bearing against the inner flange of the inner hub section, and an outer flange bearing against the outer flange of the inner hub section, and a covering secured to the outer end of the outer hub section and inclosing the outer end of the inner hub section.

9. A spring wheel comprising an inner hub section having flanges at its inner and outer ends, spring bars supported on said flanges, an outer hub section supported on said bars and provided with an inner flange bearing against the inner flange of the inner hub section, and an outer flange bearing against the outer flange of the inner hub section and balls interposed between said outer flanges of the hub sections, and a covering secured to the outer end of the outer hub section and inclosing the outer end of the inner hub section.

10. A spring wheel comprising an inner hub section having inner and outer flanges, spring bars supported at their ends on said flanges, an outer hub section having a barrel supported on the central part of said bars and provided with an inner flange bearing against the inner flange of the inner hub section, an outer detachable flange screwed into the outer end of said hub barrel, a plurality of balls mounted on said detachable flange and bearing against the outer side of the outer flange of the inner hub section, a clamping ring screwed on the outer end of said barrel and bearing against the outer side of said detachable flange, and a cap detachably connected with said clamping ring.

11. A spring wheel comprising an axle, a plurality of springs mounted on the axle, a hub section mounted on said springs, and means for driving said hub section positively from said axle comprising a guide arranged on said hub section and having inwardly beveled or dovetail sides, an arm secured to the axle, and a dovetail slide moving in said guide and engaged by said arm.

12. A spring wheel comprising an axle, an inner hub section having a barrel secured to the axle and provided with an enlargement of its bore at the inner end thereof, springs supported on the inner hub section, an outer hub section having a barrel supported on said springs, and means for operatively connecting the axle and the outer hub section comprising a sleeve arrangement within said enlargement and secured to the axle and provided on diametrically opposite sides with arms which engage with the inner end of the outer hub section, and a guide arranged on the inner end of said outer hub section and receiving one of said arms.

13. A spring wheel comprising an axle, a plurality of springs mounted on the axle, a hub section mounted on said springs, and means for driving said hub section positively from said axle comprising a guide way arranged on the hub, a slide movable in said guideway and composed of two sections provided in their opposing sides with seats, and a driving arm turning with the axle and provided on its free end with a knuckle which rests on opposite sides in said seats.

Witness our hands this 21st day of July, 1909.

EDWARD SCHUYLER.
WILLIAM A. HYLE.

Witnesses:
THEO. L. POPP,
E. M. GRAHAM.